July 7, 1953    R. L. HAMILL    2,644,372
INDEXING WORK SUPPORT
Filed March 5, 1951    2 Sheets-Sheet 1

INVENTOR.
Raymond L. Hamill
BY
Otto A. Earl
Attorney.

July 7, 1953  R. L. HAMILL  2,644,372
INDEXING WORK SUPPORT
Filed March 5, 1951  2 Sheets-Sheet 2

INVENTOR.
Raymond L. Hamill
BY Otto Earl
Attorney

Patented July 7, 1953

2,644,372

UNITED STATES PATENT OFFICE 2,644,372

INDEXING WORK SUPPORT

Raymond L. Hamill, Grass Lake, Mich.

Application March 5, 1951, Serial No. 213,934

8 Claims. (Cl. 90—57)

This invention relates to improvements in indexing work support.

The principal objects of this invention are:

First, to provide an indexing device which is readily adjustable to advance the work through a wide range of angles.

Second: To provide an indexing device which will advance or index through 180 degrees.

Third: To provide an indexing device having a smoothly accelerated and decelerated indexing motion.

Fourth: To provide an indexing device capable of being driven and controlled by a variety of external power sources so that the device is adapted to be used as an attachment for existing machine tools.

Fifth: To provide an indexing device which automatically locks and unlocks the table with each cycle of the device.

Sixth: To provide an indexing device which is inexpensive to manufacture and operate, and yet which is accurate and effective in all adjusted ranges of its indexing motion.

Other objects and advantages of my invention will be apparent from a consideration of the following description and claims:

The drawings, of which there are two sheets, illustrate a preferred form of the device.

Figure 1:
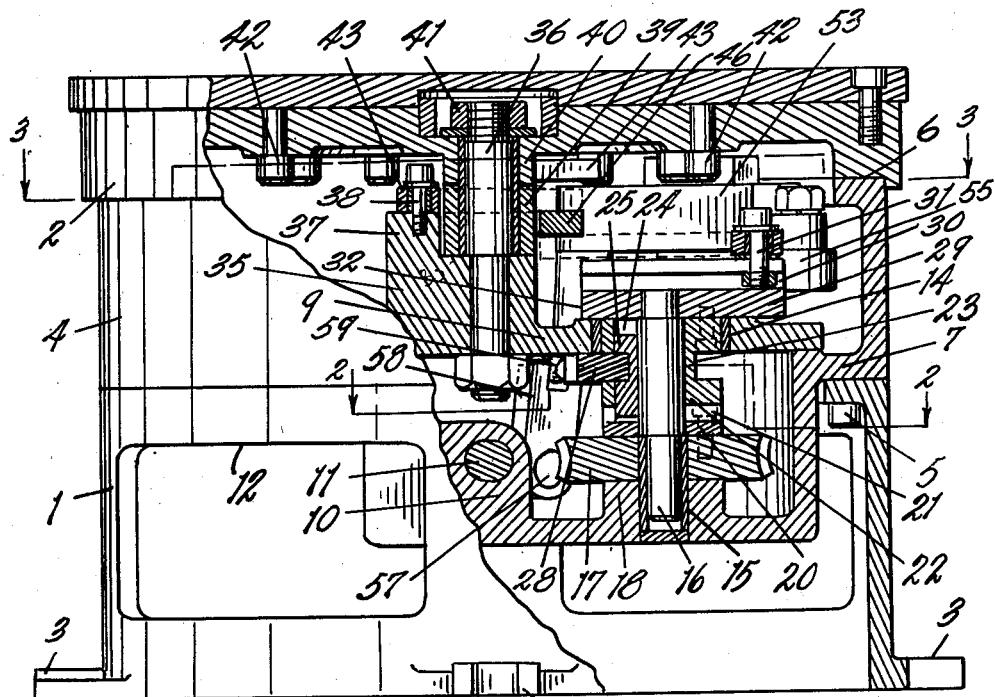
Fig. 1 is a side elevational view of the device partially broken away in vertical cross section along the plane of the line 1—1 in Fig. 2.

My device includes a cylindrical base 1 of suitable weight and height to support the rotatable indexing table 2 at the desired elevation on the machine with which it is to cooperate. The base 1 is provided with outwardly slotted radially projected lugs 3 by means of which the device may be bolted in place on a variety of machine tools. Supported on top of the cylindrical base 1 is a cylindrical body 4 which may be secured in place by screws 5 connecting it to an annular flange at the top of the base. The upper surface of the cylindrical body 4 forms a bearing and supporting surface 6 for the rotatable table 2.

Figures 2, 6:
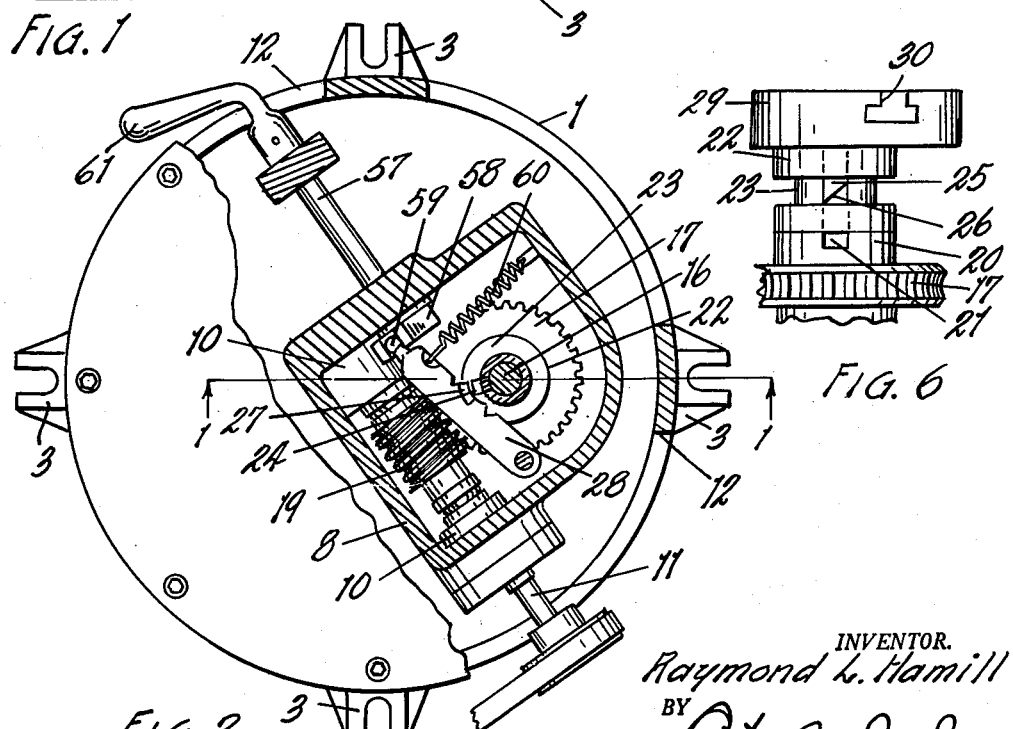
Fig. 2 is a plan view of the device partially broken away in horizontal cross section along the planes of the broken line 2—2 in Fig. 1.
Fig. 6 is an enlarged fragmentary side elevational view of the one revolution clutch connection to the driving wheel of the indexing linkage.

The body 4 is provided with a transverse lower wall 7 and the wall 7 is provided with an integral depending gear box portion 8 which hangs downwardly within the cylindrical base 1. The gear box is closed on its upper side by a bearing plate 9 and the interior of the gear box 8 is provided with bearing bosses 10 for rotatably supporting a horizontal drive shaft 11 which projects radially outwardly through the side of the base 1 as is best illustrated in Fig. 2. It will be noted that the base 1 is provided with several peripherally elongated openings 12 which permit the body 4 and drive shaft 11 to be mounted in various angularly adjusted positions with respect to the base.

The bearing plate 9 and the bottom of the gear box 8 define vertically aligned bearing openings 14 and 15 respectively for journalling the vertical pilot shaft 16. A worm wheel 17 is rotatably mounted on a bearing around the pilot shaft 16 and rests against a boss 18 on the bottom of the gear box to drivingly engage a worm 19 carried and driven by the shaft 11.

The top face of the worm wheel 17 supports and is drivingly connected to a clutch ring 20 (see Figs. 1 and 6), the top surface of the ring being diametrically slotted as at 21. Sleeved around the pilot shaft 16 and slidably engageable with the top face of the the clutch ring 20 is a clutch sleeve 22. The sleeve 22 is journalled at its upper end in the bearing opening 14 and thus also serves to locate the upper end of the pilot shaft. The sleeve 22 is provided with an external annular groove 23 and an internal axial slot 24 so proportioned that the groove and slot intersect. Vertically slidably mounted in the axial slot 24 is a bar-like clutch pawl 25 which is extendible downwardly from the sleeve 22 to engage in the slot 21 of the clutch ring 20. Intermediate of its ends, the outer side of the pawl 25 is transversely notched and axially cammed as at 26 and the cam surface thus formed is arranged to engage and coact with a cam surface 27 formed on a clutch trip lever 28 to be described in greater detail later.

The upper end of the clutch sleeve 22 is nonrotatably secured to a crank wheel 29, the wheel being positioned on top of the bearing plate 9. The top surface of the wheel 29 is provided with a diametrically extending T slot 30 for adjustable connection to a crank pin 31. The periphery of the crank wheel 29 is formed with a continous closed cam surface 32 provided with an arcuate portion 33 connected at each end by smoothly curved eccentric portions 34 (see Figs. 3 to 5).

The upper side of the bearing plate 9 alongside of the crank wheel 29 is shaped to form an upstanding boss 35 (see Fig. 1) which forms a support for the axle pin 36 centrally of the body 4 and table 2. The boss 35 is further vertically extended as at 37 alongside of the axle to form a fixed support for the pivot pin 38. A bearing positioned around the axle 36 oscillatably locates one end of a lever 39 and a hub section 40 on the under side of the table 2. A nut 41 on the top of the axle holds the hub 40 and lever 39 against the top of the boss 35.

The driving connection between the crank pin 31 on the crank wheel 29 and the table 2 includes a series of circularly arranged depending pins 42 projecting downwardly from the under side of the table. The swinging end of the lever 39 pivotally carries a crank 43 on its upper surface and the outer arm of this crank is notched on its swinging end as at 44 and is swingable radially outwardly between the positions shown in full and dotted lines in Fig. 3 to engage one of the pins 42. The other arm of the crank 43 is pivotally connected at 45 to an intermediate segmental arcuate link 46 which partially embraces the inner pivoted end of the lever 39. An anchored segmental arcuate link 47 has one end fixedly connected to the pivot bolt 38 and its other end pivotally connected to the intermediate link 46 by the pin 48. The pin 48 also serves as a pivotal driving connection to the inner end of a connecting rod 49. The outer driven end of the connecting rod 49 is pivotally connected to the crank pin 31. It will be noted that the connecting rod 49 is bent or curved at approximately right angles as at 50 so that the connecting rod will clear the inner pivoted end of the lever 39 in all positions of the linkage.

Figure 3:
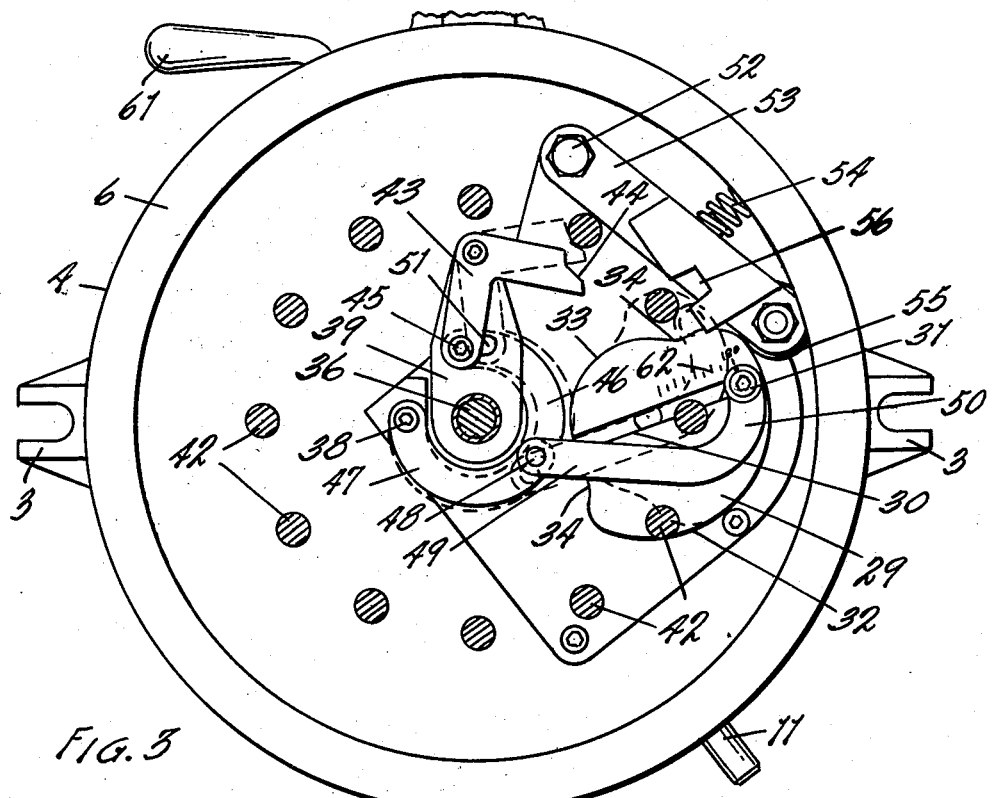
Fig. 3 is a horizontal cross sectional view through the upper portion of the device taken along the plane of the line 3—3 in Fig. 1, and illustrating the operating linkage and lock for the table of the device.
Figures 4, 5:
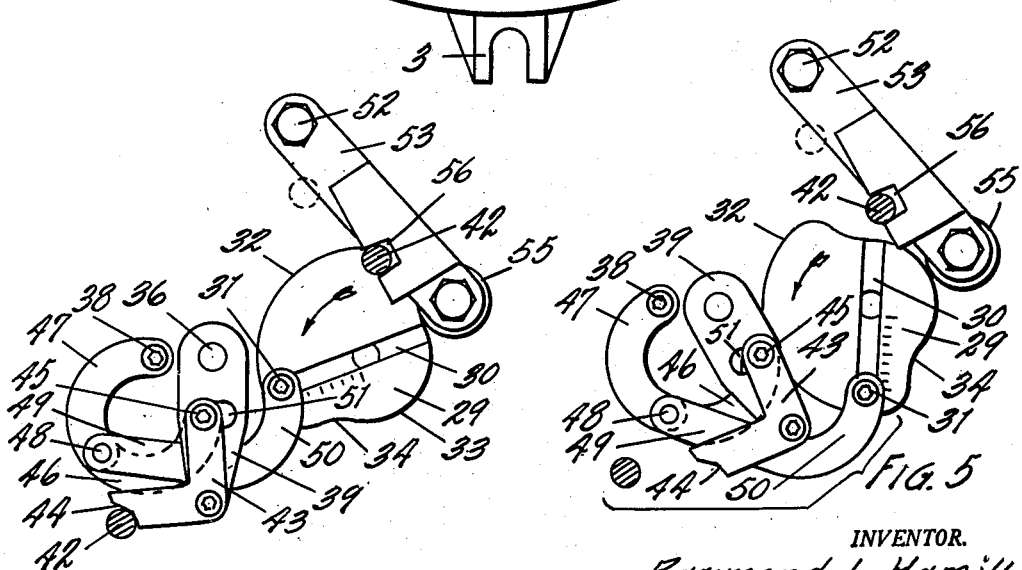
Fig. 4 is a plan view of the operating linkage at the completion of an indexing stroke.
Fig. 5 is a plan view similar to Fig. 4 but illustrating the linkage near the end of the return or idle motion thereof.

With particular reference to Figs. 3 to 5 it will be noted that rotation of the crank wheel 29 in a counterclockwise direction as indicated by the arrows, will actuate the connecting rod 50 to a combined reciprocating and oscillating motion. Starting from an "at rest" position as shown in full lines in Fig. 3 the initial movement of the crank wheel and connecting rod to the dotted position indicated, will swing both of the segmental links 46 and 47 downwardly and in a clockwise rotating motion to the positions indicated by the dotted lines. This rotatable motion of the outer end of link 46 will result in the pin 45 and the inner arm of the crank 43 being rotated in a counterclockwise direction to the position shown in dotted lines, so that the notched end 44 of the outer arm of the crank engages one of the depending pins 42 on the table. The foregoing initial movement will not effect the position of the lever 39, which is frictionally restrained against motion due to the weight of the table which bears against the pivoted end of the lever. However, continued motion of the linkage will rotate the lever 39 in a clockwise direction due to the engagement of the lower end of the pin 45 with the end of a slot 51 in the lever 39. With the pin 45 engaged with the end of the slot 51, and with the notch 44 engaged with the pin 42, continued rotation of the crank wheel 29 and reciprocation of the connecting rod 49 will swing both the lever 39 and the table 2 to the position illustrated in Fig. 4, which position corresponds to the end of the advancing or indexing motion of the table and linkage. Note that with the crank pin 31 adjusted toward the radially outer end of the T slot 30 the linkage may be made to swing the table through 180 degrees.

After the crank wheel has been rotated 180 degrees and thereafter commences its return motion, downward and retracting motion of the connecting rod 49 will first move arcuate links 46 and 47 in a counterclockwise rotating motion so that the pin 45 and the inner arm of the crank 43 are given a clockwise rotation until the pin 45 engages the trailing edge of the slot 51 in the lever. This rotation of the crank 43 swings the notched end 44 thereof out of the line of depending pins 42 so that continued retraction of the connecting rod 49 as shown in Fig. 5 will return the crank 43 and lever 39 to the initial starting position of the linkage. By varying or reducing the throw of the crank pin 31 the advancing or indexing motion of the table can be varied infinitely between zero and 180 degrees or more. As a practical matter the notched end 44 of the crank 43 must be returned to a position to register with a succeeding pin 42 on the table, so the range of adjustment of the angular indexing motion is in effect limited to the number and angular spacing of the pins 42. Theoretically, the number of these pins or corresponding projections on the under side of the table could be increased infinitely, but since it is seldom necessary to divide the indexing angle to less than 20 or 30 degrees, the twelve equally spaced pins 42 will accordingly provide the necessary range of adjustment of the table.

In order to make sure that the table stops and remains in its selected indexed position after each indexing motion, the bearing plate 9 is provided with fixed pivot pin 52 for pivotally supporting the locking lever 53. The swinging end of the lock lever 53 is urged toward the rim of the crank wheel 29 by a spring 54. A follower roll 55 is thus consistently engaged with the cam surface 34 around the periphery of the crank wheel. A locking notch 56 in the side of the lever 53 is adapted to receive and engage one of the depending pins 42 as is best illustrated in Figs. 4 and 5 to lock the table 2 in its indexing position. The extended portion 32 and retracted portion 33 of the periphery of the crank wheel 29 are angularly disposed with respect to the slot 30 so that the locking lever 53 is retracted prior to the advancing indexing motion of the linkage, and reengaged with a pin 42 at the completion of the indexing motion to remain locked with the pin until the next retracting cycle of the mechanism.

In order to assure that the crank pin 31 will not be radially adjusted to a position that will advance the table and pins 42 through an angle which is not an even multiple of the angular spacing of the pin 42, appropriate indicia marks 62 are provided alongside of the T slot for selective registry with the crank pin 31.

The foregoing discussion illustrates how a single rotatable cycle of the crank wheel will effect a complete indexing cycle of the table. The construction and operation of the one revolution clutch sleeve 22 and trip lever 28 in actuating the crank wheel 29 for a single revolutionary cycle has already been described. The trip lever 28 may be actuated by any of a wide variety of mechanisms, and the example illustrated in Fig. 2 is intended to demonstrate only one of these methods. A rock shaft 57 journaled in the body of the machine is provided with a slotted crank arm 58 which receives and controls the position of a ball head 59 on the swinging end of the trip lever 28. Spring 60 constantly urges the trip lever inwardly into engagement with the clutch pawl 25 to disengage the clutch, and it is therefore necessary to oscillate the rock shaft 57 and crank 58 each time the table is to be indexed. A handle 61 on the outer end of the rock shaft permits manual control of the clutch and indexing mechanisms. The rock shaft 57 or trip lever 28 might be mechanically interlocked with a machine with which the indexing device is associated, or a system of electrical or hydraulic controls might be arranged for actuating the rock shaft or trip lever.

Besides being adjustable for varying indexing motions between zero and 180 degrees, the driving linkage just described provides a smooth indexing motion which is highly desirable. It will be noted that in converting the rotary motion of the crank pin 31 to reciprocating motion of the crank 49 the arcuate links 46 and 47 and the pin 45 are given an oscillatory circular motion which accelerates gradually from zero to a range at the middle of the indexing motion, and decelerates gradually to zero at the end of the indexing motion. Thus the weight of the table and work pieces therein is accelerated and decelerated gradually, which prevents shock and reduces the power required to operate the indexing device.

Desirably but not necessarily the top of the indexing table 2 is provided with a separate fixture table 62 so that the indexing device can be quickly converted for advancing different types of work pieces by simply changing fixture tables having different workholding fixture thereon.

Having thus described my invention, what I claim as new and desire to secure by Letters Patent is:

1. In a work supporting and indexing device, the combination of, an upright cylindrical base adapted to be secured in a plurality of positions on a machine, a cylindrical body angularly adjustably supported on said base, a gear box carried by said body, an indexing table rotatably supported on said body and having a plurality of equal angularly spaced and circulary arranged pins depending from the under side of the table, a bearing plate closing the upper side of said gear box, an axle for said table carried by said bearing plate and projecting thereabove, a crank wheel rotatably mounted on top of said plate alongside of said axle and having a radially extending T slot in its upper surface, a crank pin adjustable in said T slot, means in said box including a worm and pinion drive and a one revolution clutch connected to rotate said crank wheel, a drive shaft connected to said worm and pinion drive extending exteriorly of said body, a lever pivoted about said axle below said table, a crank member swingably mounted on the outer end of said lever and having an outer arm swingable radially into the path of travel of said pins, an inner arm on said crank member extending radially inwardly along said lever, a first segmental arcuate link having one end pivotally connected to said inner arm, a pivot bolt connecting said link and said inner arm and projecting into a transverse slot in said lever to limit motion of said crank member independent of said lever, a second segmental arcuate link having one end fixedly pivoted on said bearing plate and on the opposite side of said axle from said crank wheel, a pin pivotally connecting the free ends of said segmental links, a connecting rod having a 90 degree horizontal bend therein concave toward said crank member and pivotally connected between the pin joining said links and said pin on said crank wheel, a locking lever pivoted on said bearing plate and having a notch in on side swingable into engagement with the pins depending from said table, the periphery of said crank wheel being formed as a cam, a follower on said locking lever engageable with said cam to retract said locking lever during advancing motion of said first lever and said table, means extending exteriorly of said base for tripping and actuating said one revolution clutch.

2. In a work supporting and indexing device, the combination of, a base adapted to be secured on a machine, a body supported on said base, and an indexing table rotatably supported on said body and having a plurality of equal angularly spaced and circularly arranged pins depending from the under side of the table, a crank wheel rotatably mounted in said body and having a radially extending slot in its upper surface, a crank pin adjustable along said slot, means in said body including a one revolution clutch connected to rotate said crank wheel, a lever pivoted to swing about the axis of said table, a crank member swingably mounted on the outer end of said lever and having an outer arm swingable into the path of travel of said pins, an inner arm on said crank member extending radially inwardly of said lever, a first link having one end pivotally connected to said inner arm, means forming a limited lost motion connection between said lever and the connected ends of said link and said arm and accommodating limited motion of said crank member independent of said lever, a second link having one end fixedly pivoted on said body and on the opposite side of the axis of said table from said crank wheel, at least one of said links being concave with respect to the axis of said table, a pin pivotally connecting the free ends of said links, and a connecting rod having a horizontal bend therein concave toward said axis and pivotally connected between the connected ends of said links and said crank pin on said crank wheel.

3. A work indexing device comprising a body adapted to be secured to a machine tool, a drive shaft journaled in said body, a table rotatable about a vertical axis centrally located with respect to said body, a crank wheel rotatable in said body about an axis parallel to and offset from the axis of said table, means including a one revolution clutch for drivingly connecting said shaft to said wheel, a plurality of equal angularly spaced projections depending from said table and circularly arranged around the axis thereof, a driving lever pivotally mounted in said body for oscillation about an axis approximately coincident with the axis of said table, a crank element pivotally carried by the outer end of said lever and parallel thereto, the outer end of said element being swingable into the path of said projections, a first link pivotally connected at one end to said element radially inwardly of its support, means forming a limited lost motion connection between said lever and said element, a second link pivotally connected to the other end of said first link and having a fixed pivotal connection to said body on the opposite side of the axis of said table from said wheel, a connecting rod pivotally connected at one end to one of said links adjacent to the pivotal connection between said links, and a crank pin radially adjustably mounted on said wheel and connected to the other end of said connecting rod.

4. A work indexing device comprising a body, a drive shaft journaled in said body, a table rotatable about an axis located within said body, a crank wheel rotatable in said body about an axis parallel to and offset from the axis of said table, means including a one revolution clutch for drivingly connecting said shaft to said wheel, a plurality of equal angularly spaced projections on the inner side of said table and circularly arranged around the axis thereof, a driving lever pivotally mounted in said body for oscillation about an axis approximately coincident with the axis of said table, a crank element pivotally carried by the outer end of said lever, the outer end of said element being swingable into the path of said projections, a first link operatively connected at one end to said element radially inwardly of its support, means forming a limited lost motion connection between said lever and said element whereby movement of said link will first move said element and will thereafter move said lever and element in unison, a second link pivotally connected to the other end of said first link and having a fixed pivotal connection to said body spaced from the axis of said table and said wheel, a connecting rod pivotally connected at one end to one of said links adjacent to the pivotal connection between said links, and a crank pin radially adjustably mounted on said wheel and connected to the other end of said connecting rod.

5. In a work indexing device, the combination of a support, a table on said support rotatable about the axis of a shaft carried by the support, annularly arranged equally spaced projections depending from the under side of said table, a crank wheel rotatably mounted on said support and offset from the axis of said table, a driving lever pivotally mounted on said support and swingable about an axis located centrally of said table, a crank pivotally carried by the swinging end of said lever and having an arm engageable with said projections on said table during advancing motion of said lever, a second arm on said crank having lost motion driving connection to said lever permitting oscillation of said crank relative to said lever and for rotatable translation with said lever, a connecting rod having one end radially adjustably connected to said wheel and having its other end pivotally connected to said second arm of said crank, and means for rotating said wheel in single complete rotary cycles.

6. In a work indexing device, the combination of a support, a table on said support rotatable about the axis of a shaft carried by the support, annularly arranged equally spaced projections depending from the under side of said table, a crank wheel rotatably mounted on said support and offset from the axis of said table, a driving lever pivotally mounted on said support and swingable about an axis located centrally of said table, a first link pivotally and drivingly connected at a point spaced from the pivot of the lever, a second link pivotally connected at one end to the other end of said first link and having a fixed pivotal connection to said support spaced from the pivot axes of the lever and said wheel, a connecting rod pivotally connected at one end to said links adjacent to the pivotal connection between the links, the other end of said rod being radially adjustably connected to said wheel, means carried by the swinging end of said lever engageable with said projections on said table during advancing motion of said lever, said means having a driving connection to said links for oscillation of said means relative to said lever and for rotatable translation with said lever, and means for rotating said wheel in single complete rotary cycles.

7. In a work indexing device, the combination of a support, a table on said support rotatable about the axis of a shaft carried by the support, annularly arranged equally spaced projections depending from the under side of said table, a crank wheel rotatably mounted on said support and offset from the axis of said table, a driving lever pivotally mounted on said support and swingable about the axis of said table, a first link pivotally and drivingly connected at a point spaced from the pivot of the lever, a second link pivotally connected at one end to the other end of said first link and having a fixed pivotal connection to said support spaced from the axis of said wheel, a connecting rod pivotally connected at one end to said links adjacent to the pivotal connection between the links, the other end of said rod being radially adjustably connected to said wheel, and means carried by the swinging end of said lever engageable with said projections on said table during advancing motion of said lever.

8. In a turret type work holding device having a table rotatably mounted on a support, a plurality of annulary arranged projections depending from said table, an indexing drive shaft rotatably carried by said support, means oscillatively driven by said shaft and engageable with successive projections on said table to index said table, a cam driven in timed relation to said shaft, and a lever pivoted on said support and swingable toward and away from said projections, said lever having a locking and locating notch therein adapted to receive one of said projections, said lever having a portion driven by said cam to swing said lever away from said projections prior to indexing motion of said table.

RAYMOND L. HAMILL.

References Cited in the file of this patent

UNITED STATES PATENTS

| Number | Name | Date |
|---|---|---|
| 2,261,052 | Coffin | Oct. 28, 1941 |

FOREIGN PATENTS

| Number | Country | Date |
|---|---|---|
| 408,394 | Great Britain | Apr. 12, 1934 |
| 592,453 | Great Britain | Sept. 18, 1947 |